United States Patent
Dörfler et al.

(10) Patent No.: US 8,784,080 B2
(45) Date of Patent: Jul. 22, 2014

(54) DIAPHRAGM PUMP FOR A SEAT ADJUSTING DEVICE AND SEAT ADJUSTING DEVICE

(75) Inventors: Erich Dörfler, Landsberg (DE); Johannes Schwarz, Fürth (DE); Paul Tindall, Lakeshore (CA); Horia Blendea, Lakeshore (CA)

(73) Assignee: L&P Swiss Holding AG, Wittenbach (CH)

( * ) Notice: Subject to any disclaimer, the term of this patent is extended or adjusted under 35 U.S.C. 154(b) by 227 days.

(21) Appl. No.: 13/051,521

(22) Filed: Mar. 18, 2011

(65) Prior Publication Data
US 2011/0229359 A1 Sep. 22, 2011

(30) Foreign Application Priority Data

Mar. 18, 2010 (EP) .................................... 10002904

(51) Int. Cl.
*F04B 43/02* (2006.01)
*F04B 45/04* (2006.01)
*B60N 2/44* (2006.01)
*F04B 43/00* (2006.01)
*B60N 2/66* (2006.01)

(52) U.S. Cl.
CPC ........... *F04B 43/0045* (2013.01); *F04B 45/043* (2013.01); *B60N 2/4415* (2013.01); *F04B 43/021* (2013.01); *F04B 43/0054* (2013.01); *F04B 45/045* (2013.01); *B60N 2/66* (2013.01); *F04B 43/028* (2013.01)
USPC ........ 417/480; 417/413.1; 417/269; 417/549; 417/307; 417/440

(58) Field of Classification Search
USPC .............. 417/480, 413.1, 269, 550, 545, 549, 417/552, 307, 440
See application file for complete search history.

(56) References Cited

U.S. PATENT DOCUMENTS 3,645,651 A 2/1972 Bills
4,570,676 A 2/1986 Nishio et al.
(Continued)

FOREIGN PATENT DOCUMENTS

DE 18 04 532 10/1970
DE 34 02 472 8/1985
(Continued)

OTHER PUBLICATIONS

Extended European Search Report and Opinion, European Patent Application No. 10002904.0, dated Dec. 22, 2010.
(Continued)

*Primary Examiner* — Charles Freay
*Assistant Examiner* — Christopher Bobish
(74) *Attorney, Agent, or Firm* — Michael Best & Friedrich LLP

(57) ABSTRACT

A diaphragm pump for a seat adjusting device comprises a diaphragm and a valve member which define a pump chamber therebetween. An inlet valve and an outlet valve are formed on the valve member. A pressure chamber is in fluid communication with the outlet valve and receives fluid discharged from the pump chamber via the outlet valve. One of the diaphragm and the valve member comprises a valve membrane of a pressure relief valve integrated in the pump. The valve membrane is integrally formed with the one of the diaphragm and the valve member. The valve membrane is moveable between a first configuration in which the valve membrane closes a pressure relief channel and a second configuration in which the valve membrane opens the pressure relief channel to allow fluid to be discharged from the pressure chamber.

13 Claims, 6 Drawing Sheets

(56) References Cited

U.S. PATENT DOCUMENTS

| | | | |
|---|---|---|---|
| 4,982,757 A | | 1/1991 | Ohasi et al. |
| 5,332,370 A | * | 7/1994 | Nakayama et al. ......... 417/413.1 |
| 5,571,000 A | * | 11/1996 | Zimmermann et al. ...... 417/307 |
| 5,893,609 A | * | 4/1999 | Schmidt ..................... 297/284.6 |
| 2002/0051717 A1 | | 5/2002 | Fukami |
| 2004/0105764 A1 | | 6/2004 | Käch |
| 2005/0047940 A1 | | 3/2005 | Nawa et al. |

FOREIGN PATENT DOCUMENTS

| | | |
|---|---|---|
| DE | 100 63 478 | 7/2002 |
| DE | 101 17 418 | 10/2002 |
| DE | 102 36 451 | 3/2003 |
| DE | 10 2007 005 736 | 8/2008 |
| EP | 1 072 465 | 1/2001 |
| WO | 98/58567 | 12/1998 |

OTHER PUBLICATIONS

W. Deppert/K. Stoll "Pneumatische Steuerungen", p. 69 (Copyright 1972 Vogel-Verlag, Würzburg, Germany).

* cited by examiner

DIAPHRAGM PUMP FOR A SEAT ADJUSTING DEVICE AND SEAT ADJUSTING DEVICE

CROSS REFERENCE TO RELATED APPLICATIONS

This application claims the benefit of and priority to European Patent Application No. 10 002 904.0, filed Mar. 18, 2010, the entire contents of which are incorporated herein by reference.

The invention relates to a diaphragm pump for a seat adjusting device and a seat adjusting device. The invention relates in particular to a diaphragm pump operative to supply a fluid, in particular a gas, to an inflatable chamber of a seat adjusting device.

Lumbar supports or other adjustable supports are frequently provided in seats to enhance, for example, a driver's or passenger's comfort. Lumbar support devices are provided in backrests in order to provide adequate support in the lumbar vertebral or lordosis region of a person sitting on the seat by forming a suitable support surface. Some implementations of seat adjusting devices utilize one or plural inflatable fluid chambers. The fluid chambers may be configured as inflatable cushions or bladders that change their shape and/or size in dependence on an amount of fluid contained therein. Examples for such lumbar support devices are described, for example in EP 1 072 465 A1 or in DE 100 63 478 A1. An adjustment of the adjustable support may be effected by means of a pressure source and a suitably configured pneumatic circuit comprising valves and connecting members, such as hoses. In order to reduce the risk of the fluid chamber being subject to excessive overpressure, pressure relief valves may be provided which are in fluid communication with the fluid chamber(s).

The integration of an increasing number of adjustable components into a seat enhances sitting comfort. On the other hand, installation space available in the seat is limited. Further, the integration of an increasing number of actuators and associated componentry required to couple the actuator to a mechanically or pneumatically adjustable member leads to an increase of assembly time and, thus, assembly costs. While pneumatic elements, such as pressure relief valves, may enhance life time of and/or comfort afforded by the adjustable support device, such components may add to installation space and cost.

DE 101 17 418 A1 describes an oscillating displacement pump which is configured to avoid pressure peaks. A pressure regulating diaphragm, which is separate from the pump diaphragm, is integrated into the pump so as to avoid pressure peaks in a pump chamber.

There is a continued need in the art for an improved pump for seat adjusting devices. In particular, there is a continued need in the art for a pump which allows the componentry for adjusting a fluid pressure in fluid chambers of a seat adjusting device to be provided in a compact installation space. There is also a need in the art for a pump which obviates the need for separate pressure relief valves.

According to embodiments of the invention, this need is addressed by a diaphragm pump as defined by the independent claim. The dependent claims define preferred or advantageous embodiments.

According to an aspect, a diaphragm pump for a seat adjusting device is provided. The diaphragm pump is configured to supply a fluid, in particular a gaseous fluid. The diaphragm pump comprises a diaphragm and a valve member defining a pump chamber therebetween, an inlet valve in fluid communication with the pump chamber and configured to supply fluid to the pump chamber, and an outlet valve in fluid communication with the pump chamber and configured to discharge fluid from the pump chamber. The inlet valve and the outlet valve are formed on the valve member. The pump further comprises a pressure chamber in fluid communication with the outlet valve and configured to receive the fluid discharged from the pump chamber. One of the diaphragm and the valve member comprises a valve membrane of a pressure relief valve, the valve membrane being integrally formed with the one of the diaphragm and the valve member. The valve membrane is moveable between a first configuration in which the valve membrane closes a pressure relief channel and a second configuration in which the valve membrane opens the pressure relief channel to allow fluid to be discharged from the pressure chamber.

In the diaphragm pump of this aspect, a pressure relief valve functionality is integrated into the pump. In particular, the pressure relief valve functionality may be integrated into a pump head. As the valve membrane is integrally formed with one of the other components of the diaphragm pump, the number of additional components required to implement the pressure relief valve functionality is kept moderate. The pressure relief valve is configured such that it allows fluid, in particular gas, to be discharged from the pressure chamber. The pressure chamber is the portion of the pump which, in use, supplies fluid to a seat adjusting device. The risk of overpressure conditions in a fluid chamber of the adjusting device may be reduced by the diaphragm pump.

The overpressure relief valve is distinct from the inlet valve and the outlet valve. While the valve membrane of the overpressure relief valve may be integrally formed on the valve member, the integrated overpressure relief valve is operative to discharge fluid from the pressure chamber when the pressure in the pressure chamber exceeds a threshold. The valve membrane is displaced from the first configuration to the second configuration when the pressure in the pressure chamber exceeds the threshold.

The diaphragm pump may comprise a bias member for biasing the valve membrane into the first configuration. By selecting the bias member based on an area of the valve membrane on which fluid in the pressure chamber exerts pressure, the pressure at which the pressure relief valves opens may be selected from among one of plural values. In particular, a spring constant and dimension of the bias member may be selected such that the force exerted by the bias member onto the valve membrane in the state in which the valve membrane is in the first configuration is equal to the pressure at which the relief valve is intended to open, multiplied by the area of the valve membrane on which fluid in the pressure chamber exerts pressure. The pump configuration can be easily adapted to various threshold pressures at which the integrated pressure relief valve opens.

The bias member may comprise, or may be configured as, a spring.

The diaphragm pump may comprise a diaphragm carrier supporting the diaphragm, the diaphragm carrier having a seat in which the bias member is seated. With this configuration, no dedicated elements have to be provided for supporting the bias member in the pump.

The bias member may be elastically deformable. The diaphragm carrier may comprises a guide portion for guiding the bias member while the bias member deforms elastically. Thereby, undesired axial deflection of the bias member may be prevented.

The valve membrane may comprises a sealing lip. The sealing lip may be configured such that, when the valve membrane is in its first configuration, the sealing lip engages a sealing surface to prevent discharge of fluid from the pressure chamber. When the valve membrane is integrally formed with the diaphragm, the sealing lip may engage with a surface of the valve member while the valve membrane is in its first configuration. Thereby, discharge of fluid from the pressure chamber can be suppressed while the pressure in the pressure chamber is lower than a threshold pressure.

The valve membrane may have a first side in fluid communication with the pressure chamber. The sealing lip may be provided on the first side. Thereby, discharge of fluid from the pressure chamber can be reduced while the pressure in the pressure chamber is lower than a threshold pressure.

The pressure relief channel may have a wall, and the sealing lip may be biased against the wall of the pressure relief channel when the valve membrane is in the first configuration. If a bias member is provided, the bias member may bias the valve membrane with the sealing lip against the wall of the pressure relief channel. The bias member may be arranged such that the valve membrane is interposed between the bias member and the pressure chamber.

The pressure relief channel may be in fluid communication with a chamber within a housing of the diaphragm pump. When the pressure in the pressure chamber exceeds the threshold pressure, fluid may then be discharged at a location within the pump housing. The pressure relief channel may in particular be in fluid communication with an input port of the diaphragm pump. Thereby, noise emitted to the environment when the pressure relief valve is opened may be reduced.

The pump may comprise a drive device coupled to the diaphragm and configured to cyclically displace at least one portion of the diaphragm. The drive device may include a motor, in particular an electric motor, and other components known in the art of diaphragm pumps. For illustration, the drive device may include a tappet for effecting a reciprocating motion of the portion of the diaphragm.

The valve membrane may be integrally formed with the diaphragm. Thereby, the number of additional components required to implement the pressure relief valve functionality is kept moderate. The diaphragm may be formed of an elastic material. The diaphragm may be formed of an elastomeric material.

The drive device may be configured to displace at least two portions of the diaphragm, the valve membrane being integrally formed with the diaphragm and being disposed in between the two portions. The portions displaced by the drive device may be configured as, or include, rolling bellows. If a plurality of such portions is provided, a compact design of the diaphragm can be attained if the valve membrane is positioned in between the portions.

The valve membrane may be disposed centrally in between the two portions. Thereby, a compact design of the diaphragm can be attained.

The diaphragm may comprise a connecting portion provided in between the at least one portion and the valve membrane, the connection portion having a higher flexibility than the valve membrane and being integrally formed with the diaphragm. Thereby, the valve membrane may be easily moveable relative to the portion of the diaphragm which is displaced by the drive device.

The valve member may include a valve layer formed of a flexible material. In this case, the valve membrane may be integrally formed with the valve layer. Thereby, the number of additional components required to implement the relief valve functionality is kept moderate. The valve layer may be formed of a flexible material. The valve layer may be formed of an elastomeric material.

The valve member may further include a valve layer holder which supports the valve layer. In this case, the valve layer holder may have a seat in which the bias member, e.g., a spring, is seated. The bias member may bias the valve membrane formed in the valve layer towards a pressure relief channel provided in an end lid of the pump.

According to another aspect, a seat adjusting device is provided. The seat adjusting device comprises the diaphragm pump of any one aspect or embodiment, and at least one inflatable fluid chamber in fluid communication with the pressure chamber of the diaphragm pump. The diaphragm pump having the integrated pressure relief valve reduces the risk of overpressure conditions in the fluid chamber. Installation space and installation time may be saved.

The seat adjusting device may be configured as a lumbar support device or as a side bolster support device.

According to yet another aspect, a seat is provided which includes the seat adjusting device according to an aspect or embodiment.

The diaphragm pump according to various aspects and embodiments may be utilized for adjusting components of a seat, in particular in vehicle seating. For illustration, the devices and methods may be applied to a lumbar support device, e.g., a two-way lumbar support or a four-way lumbar support, a side bolster support device or combinations thereof. The diaphragm pump may also be utilized for adjusting other components of a seat.

Embodiments of the invention will be described with reference to the accompanying drawings.

Exemplary embodiments of the invention will be described with reference to the drawings. While some embodiments will be described in the context of specific fields of application, such as in the context of automotive vehicle seating, the embodiments are not limited to this field of application. The features of the various embodiments may be combined with each other unless specifically stated otherwise.

Figure 1:
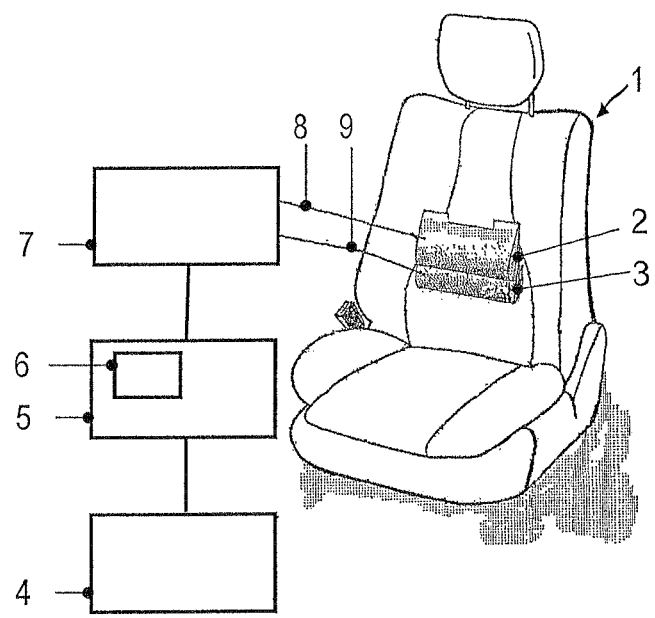
FIG. 1 is a schematic view of a seat having an adjusting device including a pump with integrated pressure relief valve according to an embodiment.

FIG. 1 is a schematic view of a vehicle seat 1 having an adjusting device which utilizes a diaphragm pump with integrated pressure relief valve according to an embodiment. The adjusting device is illustrated to be a four-way lumbar support device. The lumbar support device includes inflatable fluid chambers, which are configured as a first inflatable bladder 2 and a second inflatable bladder 3. The first and second bladders 2 and 3 are configured to change their exterior dimensions when a gas pressure in the respective bladder is adjusted. The first and second bladders 2 and 3 are provided at a lower portion of the backrest of the vehicle seat 1 and are offset relative to each other in a longitudinal direction of the backrest. By inflating or deflating both bladders 2 and 3, the amount of curvature in the lower backrest portion may be adjusted. By inflating one of the bladders while deflating the other one, the apex position may be shifted. Thereby, a four-way lumbar support device may be implemented. While a lumbar support device is illustrated in FIG. 1, the bladders 2 and 3 may also be provided at other positions of the seat. For illustration, the bladders 2 and 3 may also be provided in side bolster portions of the seat to implement a side bolster support device.

The adjusting device further includes a diaphragm pump 5 having a drive mechanism 6, e.g., a motor, a valve assembly 7, and a control device 4. The valve assembly 5 is configured to receive gas provided by the diaphragm pump 5 and to supply the gas to the first bladder and/or the second bladder via fluid lines 8, 9. The control device 4 is configured to allow a user to control operation of the motor 6 of the pump 5 to thereby control inflation of the first and second bladders 2 and 3. The control device 4 may further be configured to allow a user to control the valve assembly 7, for example by allowing a user to select to which one of the bladders 2 and 3 fluid is supplied.

The diaphragm pump 5 has an integrated pressure relief valve. Embodiments of the diaphragm pump 5 will be described with reference to FIGS. 2-6. In various embodiments, the pressure relief valve includes a valve membrane which is moveable between a first configuration and a second configuration. In the first configuration, a pressure relief channel is closed by the valve membrane. In the second configuration, the pressure relief channel is opened by the valve membrane to allow fluid to be discharged from a pressure chamber.

In various embodiments, the valve membrane of the pressure relief valve is integrally formed with another component of the diaphragm pump. I.e., the valve membrane of the pressure relief valve forms a portion of, and is formed of the same material as, the respective other component of the diaphragm pump.

Figure 2:
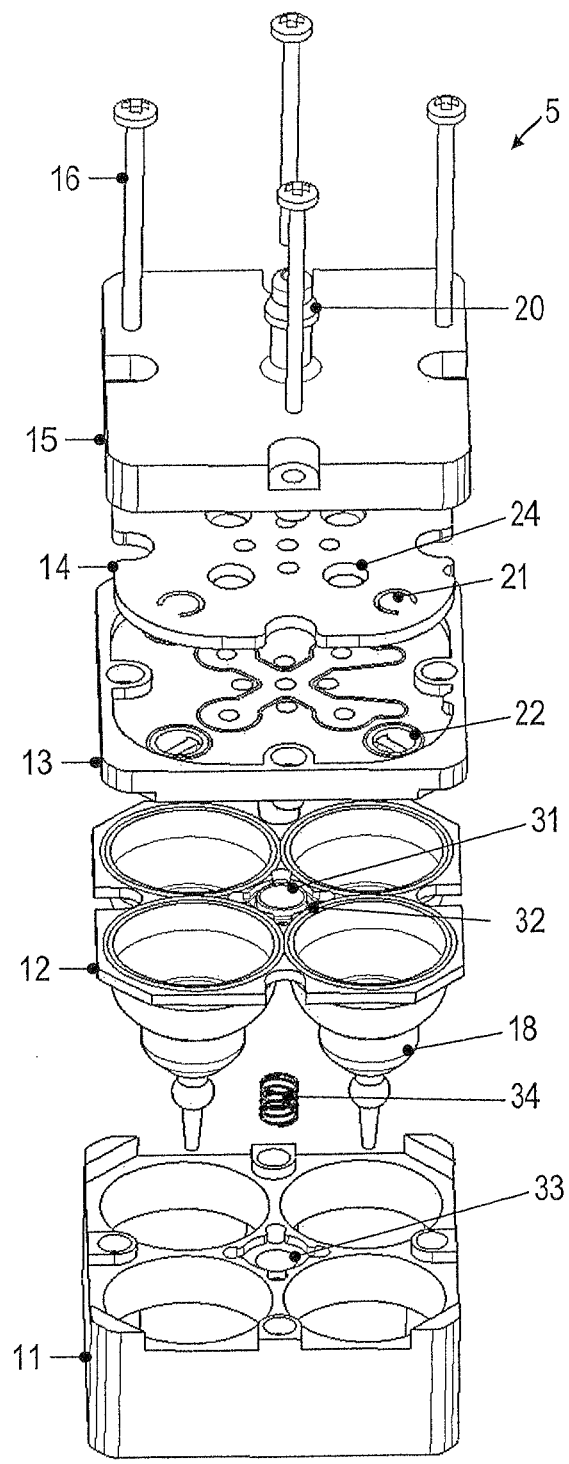
FIG. 2 is an exploded partial view of a diaphragm pump according to an embodiment.
Figure 3:
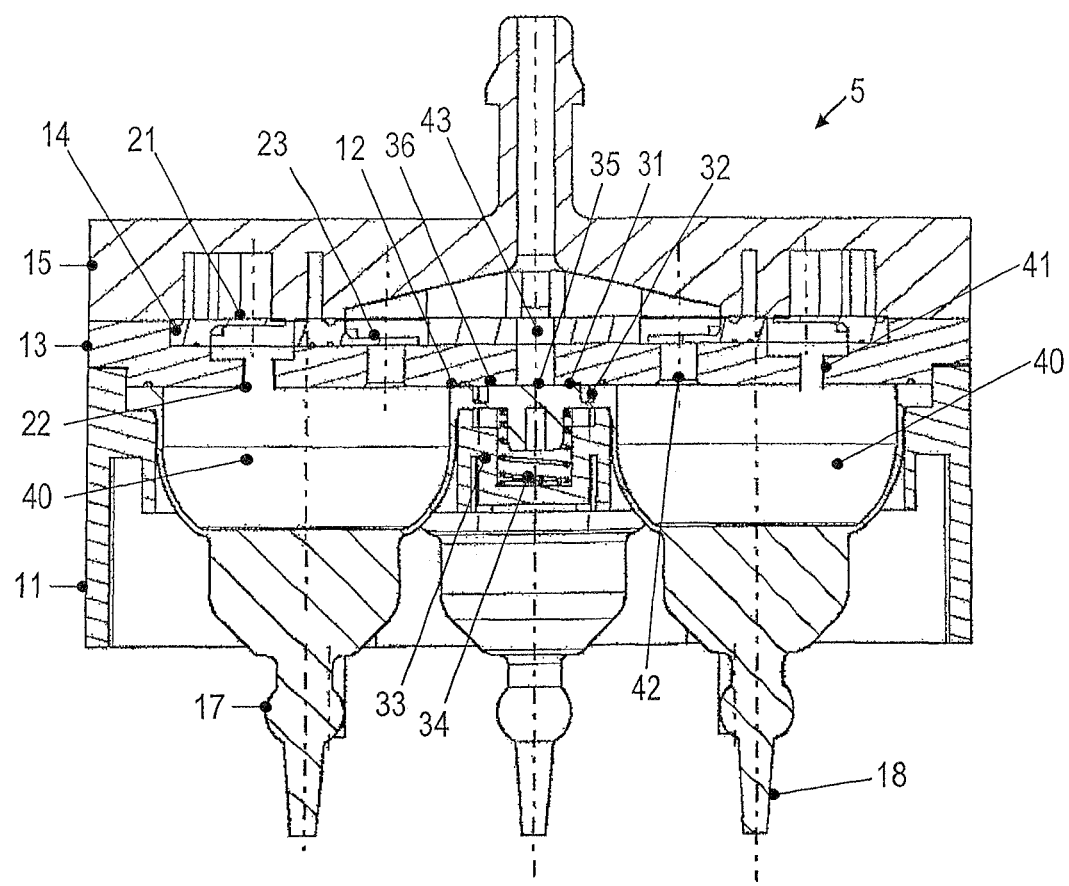
FIG. 3 is a sectional view of the assembled diaphragm pump of FIG. 2 in a state in which the pressure relief valve is closed.
Figure 4:
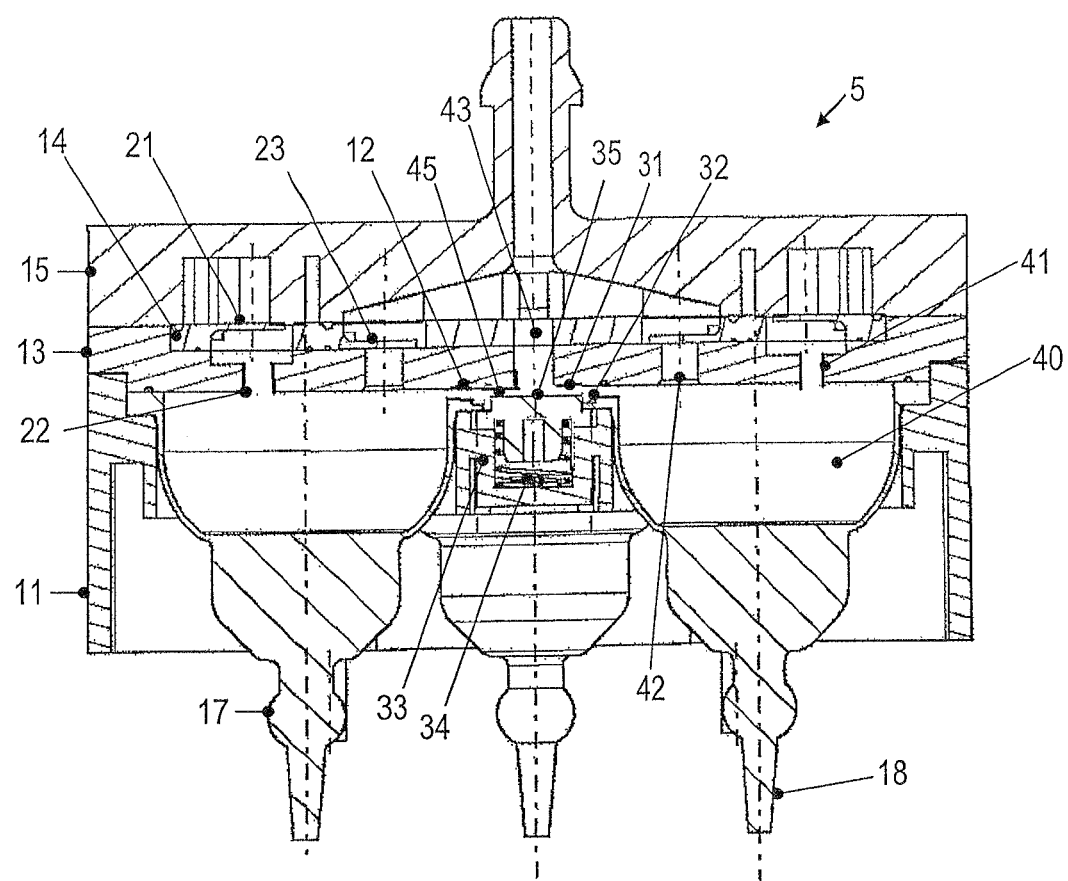
FIG. 4 is a sectional view of the assembled diaphragm pump of FIG. 2 in a state in which the pressure relief valve is open.

A diaphragm pump 5 having an integrated pressure relief valve according to an embodiment is illustrated in FIGS. 2-4. FIG. 2 is an exploded partial view of the pump 5. FIGS. 3 and 4 show sectional views of the assembled pump 5. For clarity, only components disposed toward the pump head are illustrated. It will be appreciated that, in each one of the embodiments described in detail below, the pump further includes a drive mechanism for displacing portions of the diaphragm, which is schematically illustrated at 6 in FIG. 1. FIG. 3 shows the pump 5 in a state in which a pressure in a pressure chamber is below a threshold pressure, and the pressure relief valve is closed. FIG. 4 shows the pump 5 in a state in which a pressure in the pressure chamber exceeds the threshold pressure, and the pressure relief valve is opened.

As best seen in FIG. 2, the pump 5 includes a diaphragm carrier 11, a diaphragm 12, a valve layer holder 13, a valve layer 14 and an end lid 15. The diaphragm 12 is supported by the diaphragm carrier 11. The valve layer holder 13 is arranged such that an end face of the diaphragm 12 is disposed in between the diaphragm carrier 11 and the valve layer holder 13. A pump chamber 40 is formed in between the diaphragm 12 and the valve layer holder 13. The flexible valve layer 14 is supported on the valve layer holder 13. In between the flexible valve layer 14 and the inner surface of the end lid 15, a pressure chamber 43 is defined. Bolts 16 are provided to secure the end lid 15, the valve layer holder 13 and the diaphragm carrier 11 to each other. A connector 20 allows a fluid line to be connected to the pump in a sealing manner. Another end of the fluid line may be coupled to a fluid chamber of a seat adjusting device.

The diaphragm 12 is formed of a flexible material, for example of an elastomeric material. The diaphragm 12 includes a plurality of rolling bellows 17, 18 extending from a top face of the diaphragm in a direction away from the valve layer holder 13. A drive device is coupled to the rolling bellows 17, 18 to cyclically displace the rolling bellows 17, 18.

The valve layer 14 and the valve layer holder 13, in combination, form a valve member which has inlet and outlet valves for the pump chamber 40. The valve layer 14 has an essentially planar shape, and is therefore also referred to as valve plate. The valve layer 14 is formed of a flexible material, for example of an elastomeric material. As best seen in FIG. 2 and FIG. 3, the valve layer 14 has tabs 21 and 23. The tabs are provided in proximity to cut-outs 24 in the valve layer 14. The cut-outs 24 are positioned so as to correspond to through-openings 22 formed in the valve layer holder 13. The valve layer 14, the valve layer holder 13 and the end lid 15 are configured such that some of the tabs, e.g., tab 21, allow fluid to be passed into the fluid chamber 40 while preventing passage of fluid in the opposite direction. Thereby, an inlet valve 41 is formed. The valve layer 14, the valve layer holder 13 and the end lid 15 are configured such that some other tabs, e.g., tab 23, allow fluid to be passed from the fluid chamber 40 to the pressure chamber 42 while preventing passage of fluid in the opposite direction. Thereby, an outlet valve 42 is formed.

The pump 5 has an integrated pressure relief valve. The pressure relief valve includes a valve membrane 31 and a bias spring 34 which biases the valve membrane 31 toward a face of the valve layer holder 13 facing the diaphragm 12. The valve membrane 31 is formed as a centre portion of the diaphragm 12. The valve membrane 31 is an integral portion of the diaphragm 12. The valve membrane 31 is disposed in between opposite pairs of rolling bellows 17, 18. Connecting portions 32 having a reduced thickness are formed in between the rolling bellows 17, 18 and the valve membrane 31. The connecting portions 32 have a higher flexibility than, for example, the valve membrane 31 itself. The connecting portions 32 thus serve as flexible link that prevent undesired opening of the relief valve when one of the rolling bellows is displaced, and which facilitate motion of the valve membrane 31. The valve membrane 31 and the connecting portions 32 are integrally formed with the other portions of the diaphragm 12. In particular, the rolling bellows 17, 18, the valve membrane 31 and the connecting portions 32 may be formed of the same material, for example of a plastic material, in particular of an elastomeric material. The rolling bellows 17, 18, valve membrane 31 and connecting portions 32 may be formed as an integrally formed diaphragm 12 by various molding techniques known in the art.

The bias spring 34 is received in a bias seat 33 formed in a centre portion of the diaphragm carrier 11. The bias seat 33 is formed as a concavity. An inner diameter of the concavity is slightly larger than an outer diameter of the bias spring 34. The lateral walls of the bias seat 33 prevent undesired axial deflections of the bias spring 34.

As best seen in FIGS. 3 and 4, a first surface 35 of the valve membrane 12 is in fluid communication with the pressure chamber 43. A fluid pressure, in particular a gas pressure, at the first surface 35 of the valve membrane 31 corresponds essentially to the pressure in the pressure chamber 43. A sealing lip 36 is circumferentially formed on the first surface 35 of the valve membrane 31. When the valve membrane 31 is in the first configuration illustrated in FIG. 3, the sealing lip 36 abuts on, and is biased against, the surface of the valve layer holder 13 facing the diaphragm 12.

When the fluid pressure at the first surface 35 of the valve membrane 31 exceeds a given threshold, the valve membrane 31 is displaced against the bias of the bias spring 34. The valve membrane 31 is displaced from the first configuration shown in FIG. 3 to the second configuration shown in FIG. 4. The valve membrane 31 is displaced such that a pressure relief channel 45 is opened to discharge fluid from the pressure chamber 43 to the input port of the pump. While not illustrated, the valve membrane may also be displaced such that the pressure relief channel 45 is arranged such that fluid is discharged from the pressure chamber 43 and output at another suitable location within the pump housing, so as to allow fluid to be discharged at a location within the pump housing. In some embodiments, the valve membrane 31 is configured such that the pressure relief channel 45 is made to open for at least some positions of the rolling bellows 17, 18 of the diaphragm 12 when the pressure in the pressure chamber 43 exceeds a threshold.

The pressure relief channel 45 allows fluid to be discharged from the pressure chamber 43. When a fluid chamber 2 or 3 of the seat adjusting device is in fluid communication with the pressure chamber 43, for example while fluid is supplied to the respective fluid chamber 2 or 3, overpressure conditions may be prevented by the pressure relief valve formed integrally in the pump 5.

The threshold pressure at which the valve membrane 31 is displaced from the first configuration to the second configuration is determined by the force exerted by the bias spring 34 onto the valve membrane 31 while the valve membrane 31 is in the first configuration, and by the area of the first surface 35 exposed to the fluid pressure in the pressure chamber 43. By selecting the bias spring 34 to apply a pre-determined force on the valve membrane 31, the threshold pressure may be adjusted. An appropriate spring or other bias member can be readily inserted into the bias spring seat 33 during assembly of the pump 5. The pump 5 can be adapted to one of plural different configurations, which correspond to different threshold pressures, by selecting a suitable bias member.

Figure 5:
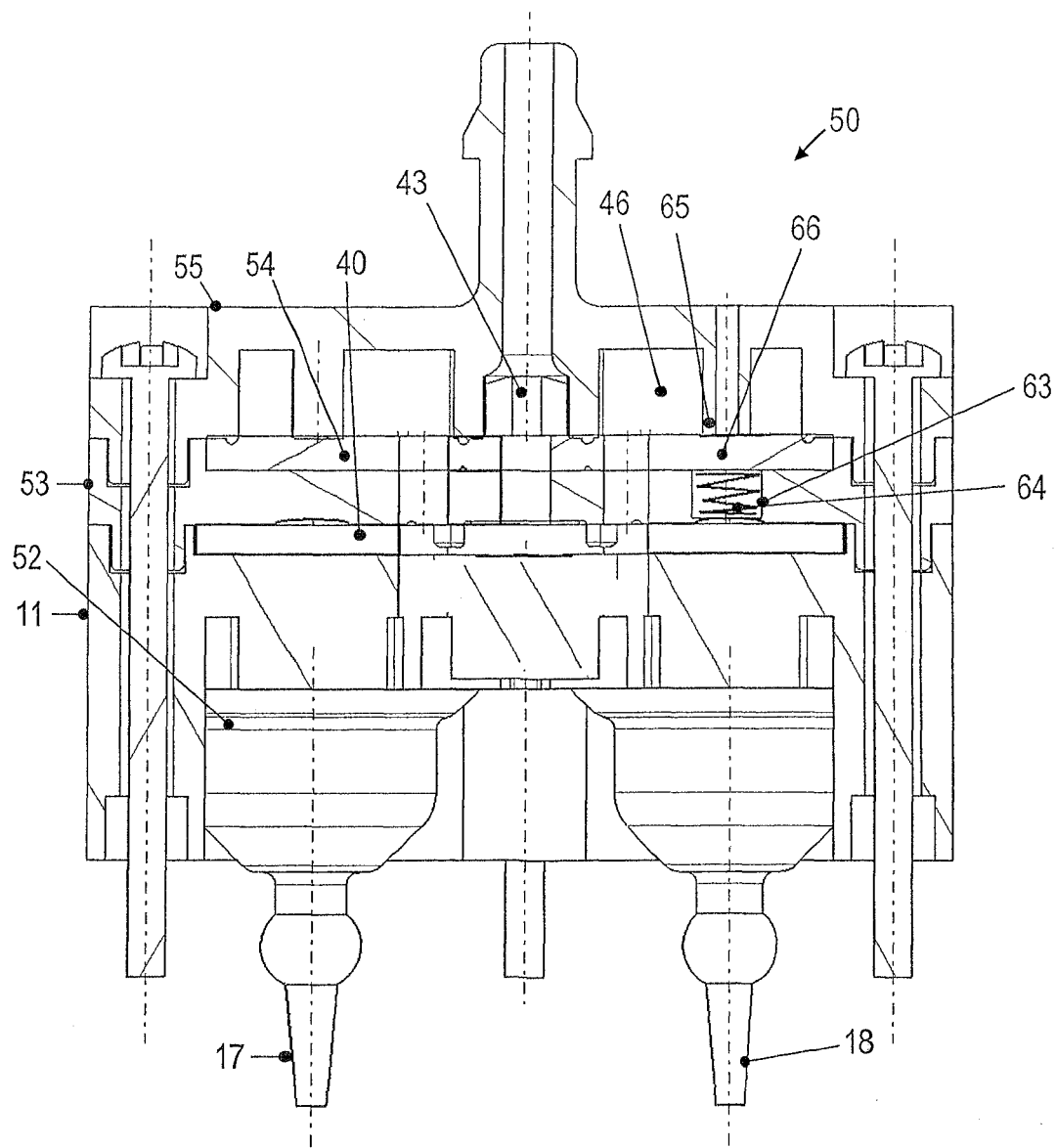
FIG. 5 is a sectional view of a diaphragm pump according to another embodiment.

FIG. 5 is a sectional, partial view of a diaphragm pump 50 according to another embodiment. For clarity, only components disposed toward the pump head are illustrated. It will be appreciated that the pump 50 further includes a drive mechanism for displacing the diaphragm, which is schematically illustrated at 6 in FIG. 1. FIG. 5 shows the pump 5 in a state in which a pressure in a pressure chamber is below a threshold pressure, and the pressure relief valve is closed.

The pump 50 includes a diaphragm carrier 11, a diaphragm 52, a valve layer holder 53, a flexible valve layer 54 and an end lid 55. The diaphragm 52 is supported by the diaphragm carrier 11. The valve layer holder 53 is arranged such that an end face of the diaphragm 52 is disposed in between the diaphragm carrier 11 and the valve layer holder 53. A pump chamber 40 is formed in the space between the diaphragm 12 and the valve layer holder 53. The valve layer 54 is supported on the valve layer holder 53. In between the flexible valve layer 54 and the inner surface of the end lid 15, a pressure chamber having a central compartment 43 and further compartments 46 in fluid communication with the compartment 43 is defined.

The valve layer 54 and valve layer holder 53 in combination form a valve member in which inlet and outlet valves are provided, as has been explained with reference to FIGS. 2-4. In particular, the valve layer 54 may be provided with lobes and cut-outs, and the valve layer holder 53 may be provided with corresponding through-openings to implement inlet and outlet valves, respectively. The inlet and outlet valves are not shown in the sectional view of FIG. 5.

The diaphragm 52 includes a plurality of portions 17, 18, formed for example as rolling bellows, which are displaced by a drive device. In the pump 50, the diaphragm 52 is not provided with a valve membrane of a pressure relief valve. However, the pump 50 has an integrated pressure relief valve, as will be explained in more detail below.

The integrated pressure relief valve of the pump 50 includes a valve membrane 66, a bias spring 64 and a pressure relief channel 65. The valve membrane 66 is integrally formed with the flexible valve layer 54. I.e., the valve membrane 66 forms a portion of, and is formed of the same material as, the flexible valve layer 54. The bias spring 64 biases the valve membrane 66 towards an end of the pressure relief channel 65. The bias spring 64 is received in a bias spring seat 63 provided in the valve layer holder 53. Side walls of the bias spring seat 63 guide the bias spring 64 when it compresses and decompresses. In the first configuration illustrated in FIG. 5, the valve membrane 66 sealingly abuts on the end of the pressure relief channel 65.

A first surface of the valve membrane 66 is in fluid communication with the portion 46 of the pressure chamber. When the pressure in the portion 46 of the pressure chamber exceeds a given threshold value, the bias spring 64 will be compressed, and the valve membrane 66 will be deformed to have a U-shape. Thereby, the configuration of the valve membrane 66 changes from the planar first configuration illustrated in FIG. 5 to a curved second configuration. In the second configuration, a gap opens in between the valve membrane 66 and the end of the pressure relief channel 65, which allows fluid to be discharged from the pressure chamber via the pressure relief channel 65.

Similarly to the pump 5 of FIGS. 2-4, the diaphragm pump 50 having an integrated pressure relief valve of FIG. 5 may be utilized to reduce the risk of overpressure conditions, for example in adjusting devices for vehicle seats. The pump 50 can be configured for one of various threshold pressures by selecting an appropriate bias spring 64.

Figure 6:
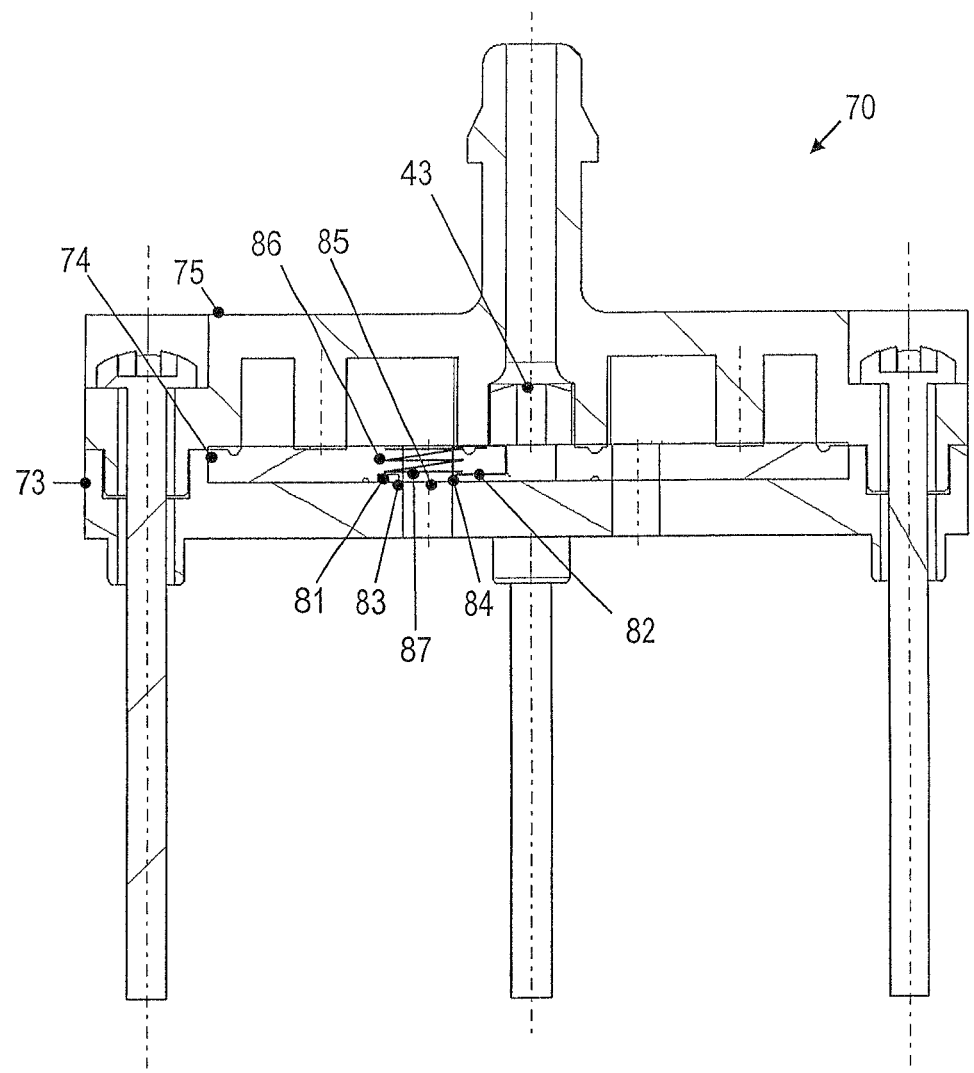
FIG. 6 is a sectional view of a diaphragm pump according to yet another embodiment.

FIG. 6 is a sectional, partial view of a diaphragm pump 70 according to another embodiment. For clarity, only components disposed toward the pump head are illustrated. It will be appreciated that the pump 70 further includes a drive mechanism for displacing the diaphragm, which is schematically illustrated at 6 in FIG. 1.

The pump 70 includes a valve layer holder 73, a valve layer 74 and an end lid 75. While not shown in FIG. 6, the pump 70 further includes a diaphragm and diaphragm carrier which may correspond, in construction and/or function, to the diaphragm and diaphragm carrier of the pump 50. The valve layer 74 and valve layer holder 73 in combination form a valve member. The valve layer 74 is formed of a flexible material. For illustration, the valve layer 74 may be formed of a plastic material, in particular an elastomeric plastic material. The valve layer 74 and the valve layer holder 73 are again configured such that one or plural inlet valves and one or plural outlet valves are formed in the valve member. For illustration, fluid may be allowed to pass into a pump chamber via a passage 85 formed in the valve layer 74 and the valve layer holder 73 via a suitably configured inlet valve. The passage 85, and the cavity in the end lid 75 adjacent thereto, is at ambient pressure.

The pump 70 has an integrated relief valve. The integrated relief valve includes a valve membrane 86 which is integrally formed with the valve layer 74 and a spring 87. The valve membrane 86 is constituted by the portion of the valve layer 74 surrounding the passage 85. In the valve membrane 86, recesses 81 and 82 are formed. The cavity defined by the recess 82 and the valve layer holder 73 is in fluid communication with the pressure chamber 43. The valve layer 74 may further be configured such that the valve membrane cavity defined by the recess 83 and the valve layer holder 73 is in fluid communication with the pressure chamber 43. Suitable channels may be provided in the valve lay 74 to establish the fluid communication.

Sealing lips 83 and 84 are provided on the valve layer 74. In the first configuration of the valve membrane 66 shown in FIG. 6, the sealing lips 83 and 84 are biased into sealing abutment on the valve layer holder 73 by the bias spring 87.

When the pressure in the pressure chamber 43 increases, the pressure in the cavity defined by the recess 82 and the valve layer holder 73 and the pressure in the cavity defined by the recess 83 and the valve layer holder 73 increases correspondingly. When the pressure exceeds a given threshold, defined by the material and shape of the valve membrane 66 and the configuration of the bias spring 87, the valve membrane 66 will deflect from the first configuration shown in FIG. 6 to a second configuration in which the sealing lips 83 and 84 are disengaged from the valve layer holder 73. In the second configuration, the valve membrane 66 opens a pressure relief channel between the recess 81 and the passage 85, and a pressure relief channel between the recess 83 and the passage 85. Fluid is discharged from the pressure chamber 43 to the passage 85 of the inlet valve, which is at ambient pressure. Fluid is thus discharged to within the housing.

Similarly to the pump 5 of FIGS. 2-4 and the pump 50 of FIG. 5, the diaphragm pump 70 having an integrated pressure relief valve of FIG. 6 may be utilized to reduce the risk of overpressure conditions, for example in adjusting devices for vehicle seats. The pump 70 can be configured for one of various threshold pressures by selecting a valve layer 74 and/or bias spring 87 having one of different configurations.

Diaphragm pumps having integrated pressure relief valves according to various embodiments have been described. Other configurations may be implemented in other embodiments. For illustration, while pumps having a bias spring to bias a valve membrane into a first configuration have been described, other bias members may be utilized in other embodiments.

Additional components may be integrated into the diaphragm pump having an integrated pressure relief valve. For illustration, a valve assembly that allows gas to be selectively supplied to one of plural fluid chambers of a seat adjusting device may also be integrated into the pump head. Details of such configurations are described in European Patent Application No. 10 001 615.3.

While exemplary embodiments have been described in the context of lumbar support adjustment in the backrest of a vehicle seat, the pumps according to various embodiments of the invention are not limited to this particular field of application. Rather, embodiments of the invention may be advantageously employed to adjust various types of supports in a wide variety of seats.

What is claimed is:

1. A diaphragm pump for a seat adjusting device, configured to supply a fluid, in particular a gas, and comprising:
   a diaphragm and a valve member defining a pump chamber therebetween, said valve member having
      an inlet valve in fluid communication with said pump chamber and configured to supply fluid to said pump chamber, and
      an outlet valve in fluid communication with said pump chamber and configured to discharge fluid from said pump chamber;
   a pressure chamber in fluid communication with said outlet valve and configured to receive said fluid discharged from said pump chamber, wherein said diaphragm comprises a valve membrane of a pressure relief valve, said valve membrane being integrally formed with said diaphragm, said valve membrane being moveable in operation between a first configuration in which the valve membrane closes a pressure relief channel and a second configuration in which said valve membrane opens said pressure relief channel to allow fluid to be discharged from said pressure chamber;
   a bias member for biasing said valve membrane into said first configuration; and
   a diaphragm carrier supporting the diaphragm, the diaphragm carrier having a seat in which the bias member is received.

2. The diaphragm pump of claim 1, wherein said bias member is elastically deformable, and wherein said diaphragm carrier comprises a guide portion for guiding said bias member while said bias member deforms.

3. The diaphragm pump of claim 1, wherein said valve membrane comprises a sealing lip.

4. The diaphragm pump of claim 3, wherein said valve membrane has a first side in fluid communication with said pressure chamber, said sealing lip being provided on said first side.

5. The diaphragm pump of claim 3, wherein said pressure relief channel has a wall, said sealing lip being biased against said wall when said valve membrane is in said first configuration.

6. The diaphragm pump of claim 1, wherein said pressure relief channel is in fluid communication with a chamber within a housing of said diaphragm pump, in particular with an input port of said diaphragm pump.

7. The diaphragm pump of claim 1, comprising a drive device coupled to said diaphragm and configured to cyclically displace at least one portion of said diaphragm.

8. The diaphragm pump of claim 7, wherein said drive device is configured to displace at least two portions of said diaphragm, said valve membrane being integrally formed with said diaphragm and being disposed in between said two portions.

9. The diaphragm pump of claim 8, wherein said valve membrane is disposed centrally in between said two portions.

10. The diaphragm pump of claim 7, wherein said diaphragm comprises a connecting portion provided in between said at least one portion of said diaphragm and said valve membrane, said connecting portion having a higher flexibility than said valve membrane and being integrally formed with said diaphragm.

11. The diaphragm pump of claim 1, wherein said valve member includes a valve layer formed of a flexible material, said valve membrane being integrally formed with said valve layer.

12. A seat adjusting device, comprising the diaphragm pump of claim 1, and at least one inflatable fluid chamber in fluid communication with said pressure chamber of said diaphragm pump.

13. The seat adjusting device of claim 12, which is configured as a lumbar support device or as a side bolster support device.

* * * * *